(12) United States Patent
Kato

(10) Patent No.: US 9,185,102 B2
(45) Date of Patent: Nov. 10, 2015

(54) SERVER SYSTEM AND CONTROL METHOD

(71) Applicant: CANON KABUSHIKI KAISHA, Tokyo (JP)

(72) Inventor: Yutaka Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/180,542

(22) Filed: Feb. 14, 2014

(65) Prior Publication Data
US 2014/0237580 A1 Aug. 21, 2014

(30) Foreign Application Priority Data
Feb. 15, 2013 (JP) ................... 2013-027837

(51) Int. Cl.
H04L 29/06 (2006.01)
(52) U.S. Cl.
CPC ....................... H04L 63/08 (2013.01)
(58) Field of Classification Search
CPC ........................................................ H04L 63/08
See application file for complete search history.

(56) References Cited

U.S. PATENT DOCUMENTS

| 5,784,463 A * | 7/1998 | Chen et al. ............. 713/171 |
| 6,313,921 B1 * | 11/2001 | Kadowaki ............. 358/1.15 |
| 7,818,582 B2 * | 10/2010 | Marion et al. ............. 713/185 |
| 2007/0199044 A1 * | 8/2007 | Hughes ............. 726/1 |
| 2009/0248632 A1 * | 10/2009 | Subramanian ............. 707/3 |
| 2012/0105906 A1 * | 5/2012 | Godavari et al. ............. 358/1.15 |
| 2012/0229838 A1 * | 9/2012 | Mogaki ............. 358/1.14 |
| 2012/0314250 A1 * | 12/2012 | Ito ............. 358/1.15 |
| 2013/0044343 A1 * | 2/2013 | Matsugashita ............. 358/1.14 |
| 2013/0094053 A1 * | 4/2013 | Shirai ............. 358/1.15 |
| 2014/0118780 A1 * | 5/2014 | Kimura ............. 358/1.15 |

FOREIGN PATENT DOCUMENTS

JP 2009-251709 A 10/2009

* cited by examiner

Primary Examiner — Mohammad L Rahman
(74) Attorney, Agent, or Firm — Canon USA Inc., IP Division

(57) ABSTRACT

There is provided a method of a server system including identifying a first token and a second token based on an identifier received from a first external information processing apparatus, acquiring data from the first external information processing apparatus with use of the first token, generating a document from the acquired data, transmitting the second token to an authentication processing apparatus, acquiring a verification result of the second token from the authentication processing apparatus, and transmitting the generated document to a second external information processing apparatus with use of the second token.

12 Claims, 21 Drawing Sheets

FIG.6

HOME

REGISTRATION OF BATCH PRINTING JOB [REGISTER] — 605

| = REQUIRED INFORMATION

INFORMATION OF BATCH JOB — 602

NAME OF BATCH JOB |[ ]

EVERY WEEK — 603
- ○ SUNDAY
- ○ MONDAY
- ○ TUESDAY
- ○ WEDNESDAY
- ○ THURSDAY
- ○ FRIDAY
- ○ SATURDAY

EVERY

TIME [0▼] : [00▼]

PRINTING PARAMETER — 604

FORM ID |[ ]   NAME OF DOCUMENT [ ]

QUERY VALUABLE [ ]   NAME OF PRINTER [ ]

| TENANT ID | SECRET KEY | SERVER B ACCESS TOKEN | SERVER B REFRESH TOKEN | SERVER C ACCESS TOKEN | SERVER C REFRESH TOKEN |
|---|---|---|---|---|---|
| 1000AA | 3cafa5fe9710... | 2f0ec5a48e0... | b6053e8b98... | 6fdf18e2d4e... | 763183dfe85a4d... |
| 1000BB | 9335e34e5aa... | 65bd86bd8e3... | 7da382007... | b1833927б8... | d9a393cf193947... |

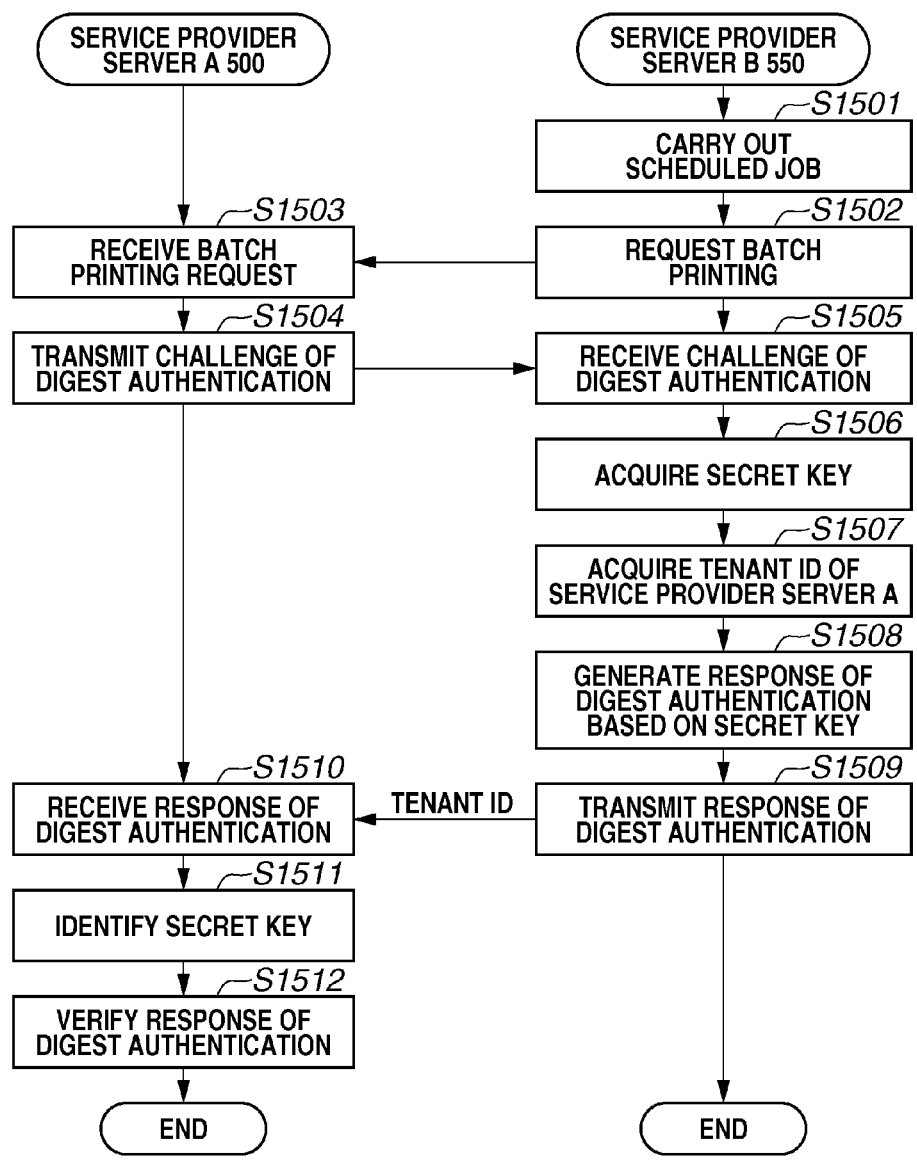

FIG.17

| realm | service a |
|---|---|
| algorithm | SHA-256 |
| nonce | MHgxMzU1MzgzNzI2MzAxKzEyNWRlMzUwNDRmNzExZTJiY2ZkMDgwMDIwMGM5YTY2 |

1701

1702 — realm
1703 — algorithm
1704 — nonce

FIG.18

| | | |
|---|---|---|
| 1802 | username | 1000AA |
| 1803 | realm | service a |
| 1804 | nonce | MHgxMzU1MzgzNzI2MzAxKzEyNWRIMzUwNDRmNzExZTJiY2ZkMDgwMDIwMGM5YTY2 |
| 1805 | algorithm | SHA-256 |
| 1806 | cnonce | 1234567890abcdef |
| 1807 | response | 51b8c5ae41fbce03e6f22fc1adf620d9784e761b68d8965fe58916574 7638ce6 |

1801

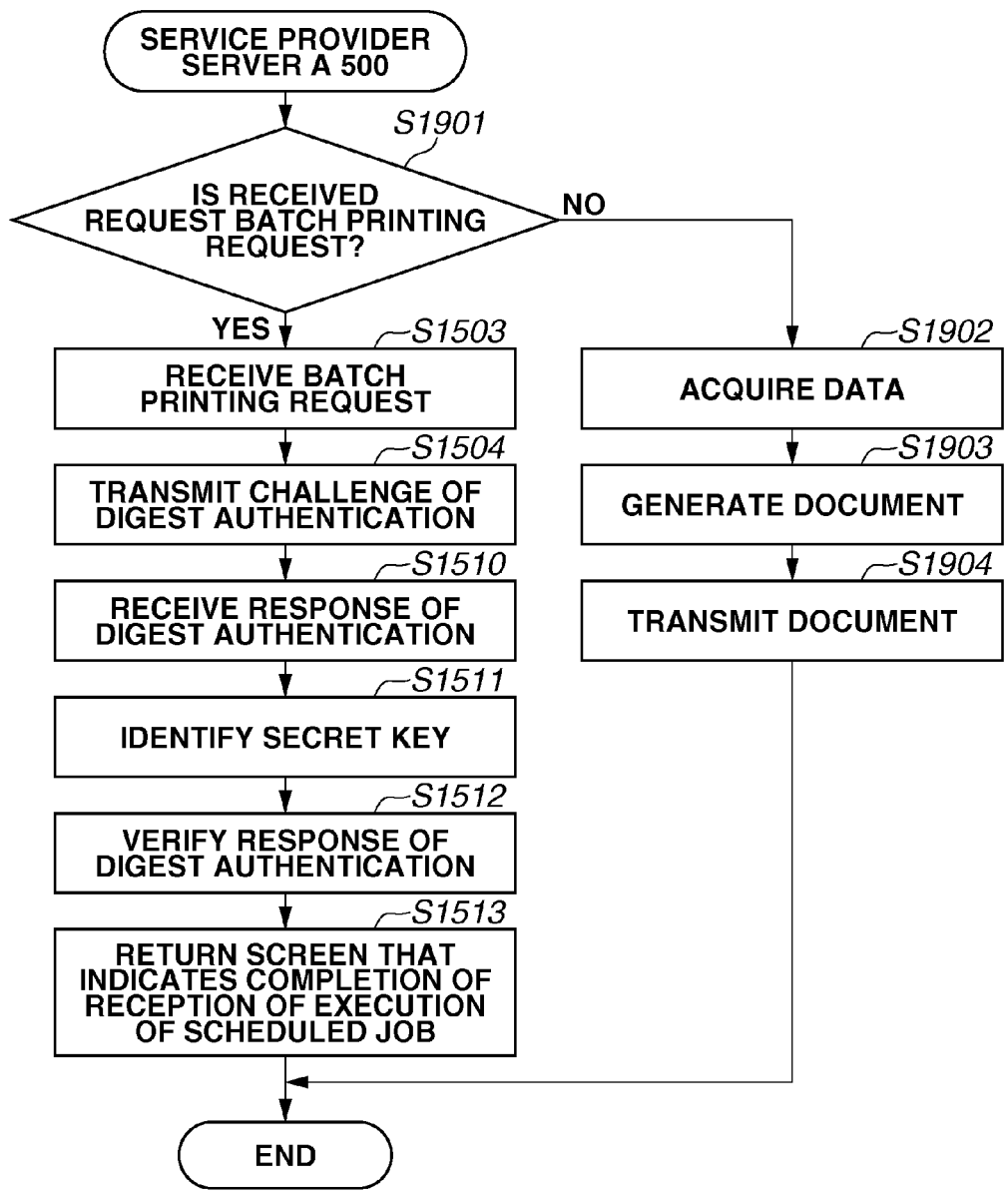

SERVER SYSTEM AND CONTROL METHOD

BACKGROUND OF THE INVENTION

1. Field of the Invention

The present invention relates to a technique of a server system and a control method.

2. Description of the Related Art

Conventionally, techniques for authentication using an access token have been disclosed.

Japanese Patent Application Laid-Open No. 2009-251709 discusses a technique in which an image forming apparatus issues a token to a terminal apparatus, and the terminal apparatus is authenticated by the image forming apparatus with use of the issued token. Further, Japanese Patent Application Laid-Open No. 2009-251709 also discusses a technique in which the token is verified by the image forming apparatus.

SUMMARY OF THE INVENTION

Now, suppose an environment under which data is acquired from a first external information processing apparatus with use of a first token corresponding to an identifier, a document is formed from the acquired data, and the generated document is transmitted to an authentication processing apparatus with use of a second token corresponding to the same identifier.

However, since the above-described environment is not assumed in the technique discussed in Japanese Patent Application Laid-Open No. 2009-251709, the first token and the second token cannot be identified from the identifier. Therefore, obviously, this technique cannot achieve both acquisition of the data from the first external information processing apparatus with use of the first token, and transmission of the document to the authentication processing apparatus with use of the second token.

The present invention is directed to a technique for identifying a first token and a second token based on an identifier, and taking advantages of the tokens by using the identified first token for a first external information processing apparatus and using the identified second token for an authentication processing apparatus.

According to an aspect of the present invention, a server system includes a reception unit configured to receive an identifier from a first external information processing apparatus, an identification unit configured to identify a first token for acquiring data from the first external information processing apparatus and a second token for acquiring a verification result from an authentication processing apparatus based on the identifier, a generation unit configured to acquire data from the first external information processing apparatus with use of the first token to generate a document from the acquired data, an acquisition unit configured to acquire the verification result of the second token from the authentication processing apparatus by transmitting the second token to the authentication processing apparatus, and a transmission unit configured to transmit the generated document to a second external information processing apparatus with use of the second token.

Further features of the present invention will become apparent from the following description of exemplary embodiments with reference to the attached drawings.

BRIEF DESCRIPTION OF THE DRAWINGS

FIG. 6 illustrates an example of a screen of the service provider server B 550 for registering a scheduled job.

FIG. 10 illustrates an example of the batch printing information of the service provider server A 500.

FIGS. 15A and 15B are flowcharts illustrating flows performed by the service provider server A 500, the service provider server B 550, the service provider server C 560, and the authentication server A 400.

FIG. 17 illustrates an example of a challenge of Digest authentication.

FIG. 18 illustrates an example of a response of Digest authentication.

FIG. 19 is a flowchart illustrating a flow performed by the service provider server A 500 according to a second exemplary embodiment of the present invention.

DESCRIPTION OF THE EMBODIMENTS

Figure 1:
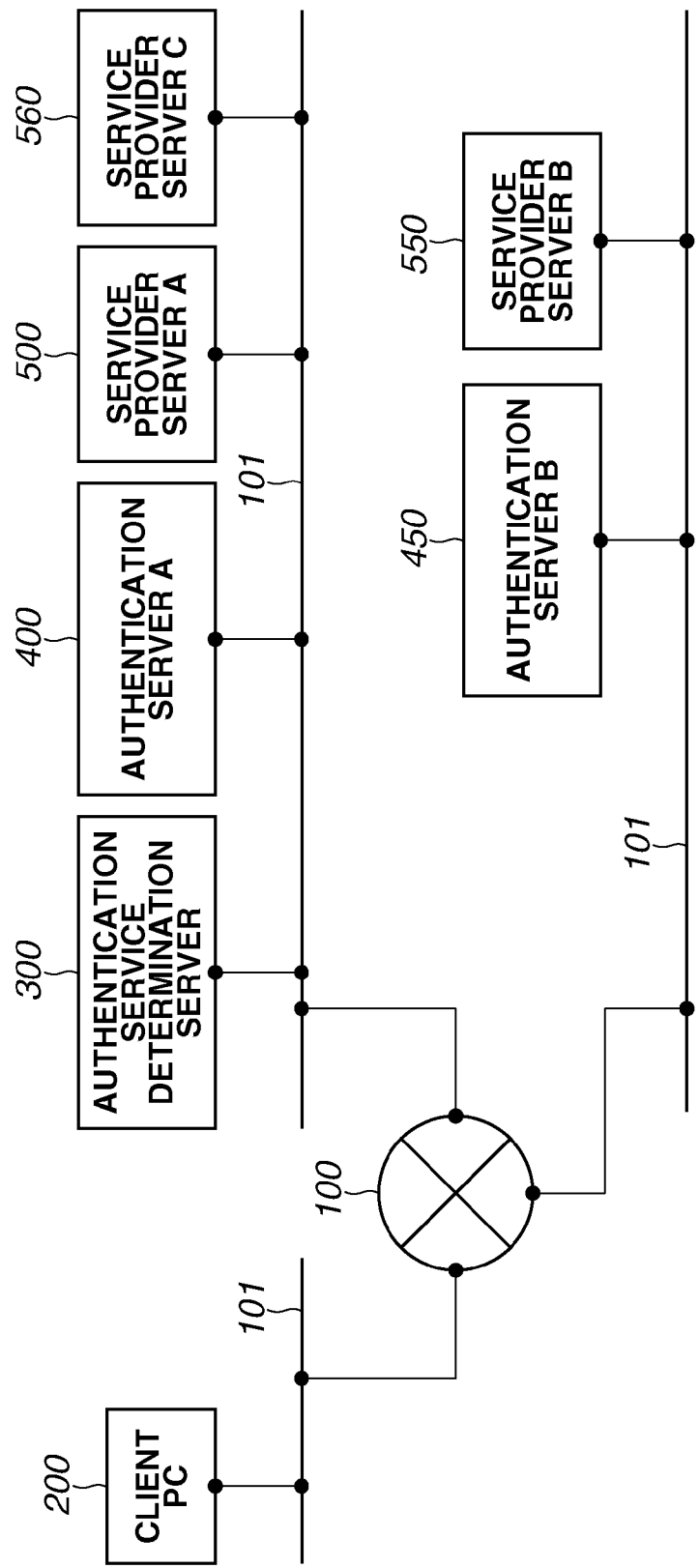
FIG. 1 is a block diagram illustrating a network configuration.

How business data is managed and how various kinds of processing are performed on a cloud platform will be now described. A user accesses a web page of the cloud platform from a browser of a client personal computer (PC) via the Internet, and displays business data that the user wants to view on the web page. For example, if the user issues a document generation instruction from this screen, the user is redirected to a document generation server, and the document generation server acquires business data stored in the cloud platform to generate a document, and transmits the generated document to the client personal computer (PC) 200 or the cloud platform. Representative examples of the cloud platform include Salesforce CRM (registered trademark) provided by Salesforce.com Incorporated.

The cloud platform and the document generation server operate in a multi-tenant manner. The tenant is a unit of a company and an organization under a contract to use the cloud platform and the document management server. A service that operates in a multi-tenant manner manages data pieces of a plurality of tenants by a single system, and manages them while separating the data pieces of the respective tenants from one another in such a manner that data of one tenant cannot be referred to by another tenant. The cloud platform and the document generation server authenticate users to allow the tenants to refer to only their respective own data pieces.

When the cloud platform and the document generation server cooperate with each other, authentication can be shared between the servers without requiring a user to be authenticated by the respective servers. One of techniques for sharing authentication among a plurality of servers is a Single Sign-On (hereinafter referred to as SSO) system based on Security Assertion Markup Language (SAML). According to the SSO system based on SAML, a user has user identifications (IDs) for both a server that provides an authentication service (IdentityProvider, hereinafter referred to an IdP) and a server that trusts an authentication result of the authentication service to provide a service (ServiceProvider, hereinafter referred to as an SP). Once the user is authenticated by the IdP, the SP trusts this authentication result and authenticates this access as the ID managed within the SP (IdP-initiated SSO). Further, when an unauthenticated user, who is not authenticated by the IdP yet, accesses the SP, the SP guides the unauthenticated user to the appropriate IdP so that the user is authenticated by the IdP (SP-initiated SSO).

To realize SSO based on SAML, the ID owned by the IdP and the ID owned by the SP are managed by associating them with each other (hereinafter referred to as user mapping). Especially, for cooperative use of a service for which user identification is indispensable, and the document generation server, IDs should be managed by the user mapping. Examples of services for which user identification is indispensable include a printing service in which documents are managed and printed by IDs.

However, the above-described method involves the following problems. If an automatic workflow system that can work through the cooperation among a plurality of service provider servers (for example, nighttime batch printing) is realized in the cloud environment, the authentication system designed for normal users cannot be used therefor because of nonintervention of a user. Further, if account information such as a username and a password is held in both sides of the service provider servers cooperating with each other, this leads to the necessity of managing even account information of another service, increasing in a security risk such as an illicit identify fraud and an information leak.

Further, the respective services in the cloud environment need to operate in a multi-tenant manner. Therefore, during execution of an automatic workflow based on cooperation among the servers, which tenant is running this workflow needs to be identified. Further, information for identifying the respective tenants needs to be separated tenant by tenant and be safely managed.

A case will be described where a system is configured in such a manner that service provider servers therein cooperate with each other to carry out a scheduled job, and this system carries out a scheduled job that works under a system authority without intervention of a user, such as nighttime batch printing. In the following description, this example will be described. At this time, a method in which cooperation among the servers can be safely realized without holding a username and a password in all servers will be also described below.

FIG. 1 is a block diagram illustrating a system configuration of a first exemplary embodiment of the present invention.

In the present exemplary embodiment, a World Wide Web (WWW) system is established via a wide area network (WAN) 100. A local area network (LAN) 101 connects respective constituent elements to one another. A plurality of LANs 101 is connected to one another via the WAN 100 so that respective apparatuses become communicatable to one another.

The client PC 200 is operated by a user, and issues a request to the service provider server A 500 and the service provider server B 550, which will be described below, with use of the browser 220. Hereinafter, the browser 220 launched on the client PC 200 will be referred to as simply the browser 220.

An authentication service determination server 300 guides user's access to an appropriate IdP.

Authentication servers A 400 and B 450 authenticate a user, respectively, and both of them operate as identity provider apparatuses (IdPs). The number of authentication services is not limited to two. Which IdP actually authenticates a user varies depending on a user accessing the system. The service provider servers A 500, B 550, and C 560 provide services, respectively. They provide services to an authenticated user. The service provider server A 500 receives a request from the client PC 200 and the service provider server B 550, and generates a document. The service provider server B 550, for example, displays and updates data held thereby according to a request from the client PC 200 and the service provider server A 500. The service provider server C 560 receives a request from the client PC 200 and the service provider server A 500, and prints a document. The service provider server A 500, the service provider server B 550, and the service provider server C 560 are not limited to providing the document generation service, the cloud platform, and the document printing service, and the services may be other services. Further, the client PC 200, the authentication service determination server 300, the authentication server A 400, the authentication server B 450, the service provider server A 500, the service provider server B 550, and the service provider server C 560 are connected to one another via the WAN network 100 and the LANs 101, respectively. The client PC 200 and the respective servers may be set up in respective individual LANs, or may be set up in a same LAN. Further, they may be set up in a same PC. The authentication service determination server 300, the authentication server A 400, the service provider server A 500, and the service provider server C 560 belong to a server group established in a same network (in an intranet), and the authentication server B 450 and the service provider server B 550 belong to a server group established in a same network (in an intranet). Further, each server may be constituted by a single apparatus, or may be constituted by a plurality of apparatuses. The system including one or more apparatuses in this manner is called a server system.

First, the client PC 200 accesses the service provider server B 550 to register a scheduled job for batch printing. Upon receiving unauthorized user access, the service provider server B 550 displays an authentication screen (not-illustrated), and authenticates the user. Upon authenticating the user, the service provider server B 550 displays a scheduled job registration screen for batch printing.

FIG. 6 illustrates an example of the scheduled job registration screen 601 for batch printing, which the service provider server B 550 provides to the browser 220 according to the present exemplary embodiment. The scheduled job registration screen 601 includes a job information setting area 602 where the user sets a name of a scheduled job, a job start time setting area 603 where the user sets a time to start the scheduled job, a printing parameter setting area 604 where the user sets printing parameters of batch printing carried out by the scheduled job, and a registration button 605 for registering these settings. The user (administrator) operates the scheduled job registration screen 601 to input the time when the user wants to carry out the scheduled job, the printing parameters, and the like, and presses the registration button 605. When the registration button 605 is pressed, the service provider server B 550 stores the instructed settings into a management area prepared for each tenant. The stored various kinds of settings regarding the scheduled job can be confirmed anytime on a scheduled job list screen, which the service provider server B 550 provides to the browser 220.

Figure 7:
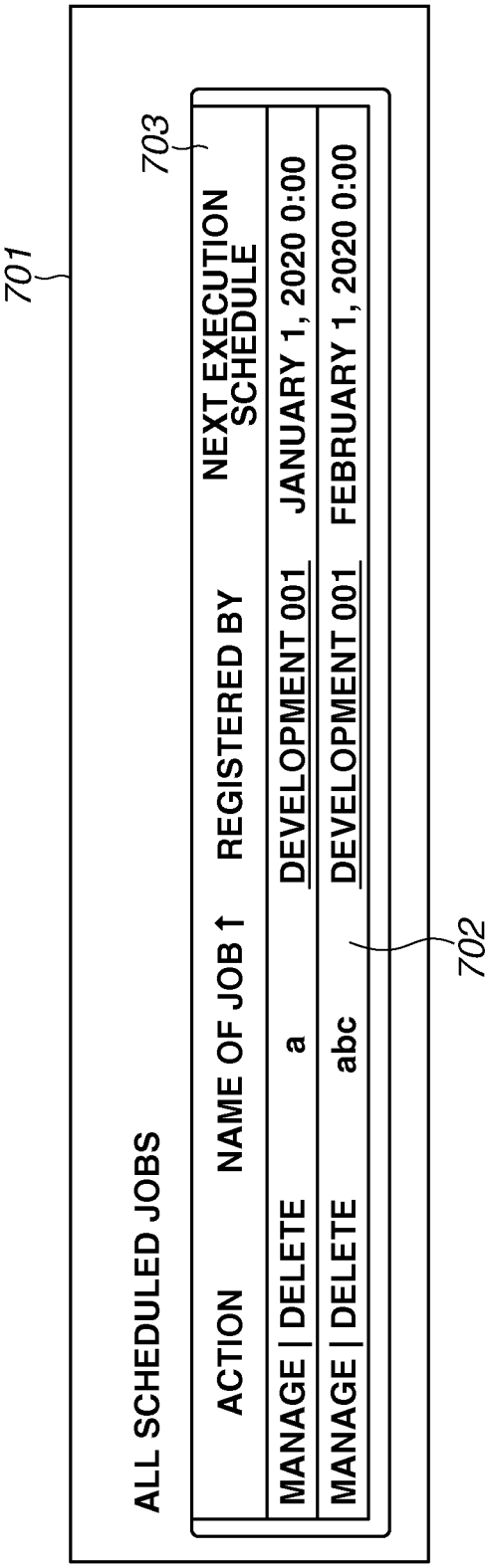
FIG. 7 illustrates an example of a screen of the service provider server B 550 indicating a list of registered scheduled jobs.

FIG. 7 illustrates an example of a scheduled job list screen 701, which the service provider server B 550 provides to the browser 220 according to the present exemplary embodiment. The user can confirm a name 702 and a start time 703 of a scheduled job by the list display.

Next, the client PC 200 accesses the service provider server A 500 to perform preliminary settings for batch printing. Upon receiving unauthorized user access, the service provider server A 500 displays an authentication screen (not illustrated), and authenticates the user. Upon authenticating the user, the service provider server A 500 displays a setting screen for batch printing.

Figure 8:
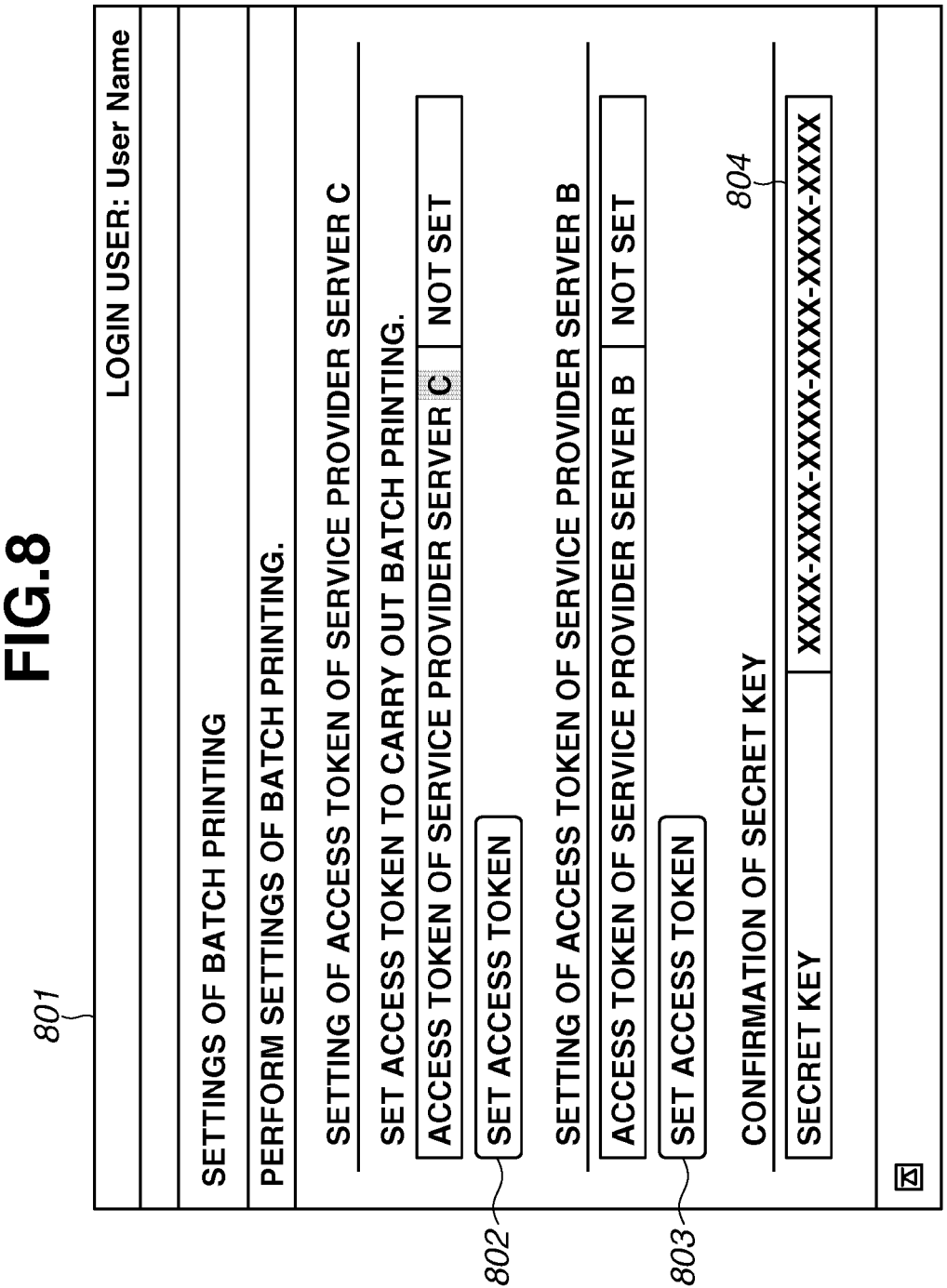
FIG. 8 illustrates an example of a screen of the service provider server A 500 for setting batch printing information.

FIG. 8 illustrates an example of a setting screen 801 for batch printing, which the service provider server A 500 provides to the browser 220 according to the present exemplary embodiment. The setting screen 801 for batch printing shows a button 802 for setting an access token of the service provider server C 560 (hereinafter, referred to as a server C access token) into a management area of the service provider server A 500, a button 803 for setting an access token of the service provider server B 550 (hereinafter, referred to as a server B access token) into the management area of the service provider server A 500, and a secret key 804 for verifying a batch printing request transmitted from the service provider server B 550. The access token is a token for permitting access to a function of each service provider server, and is usually issued by an authentication server after a user's operation for preliminary authentication. When the buttons 802 and 803 are pressed by the user (administrator), the service provider server A 500 stores the access token acquired from each server into the management area while associating it with an identification number of a tenant (tenant ID). Further, the present exemplary embodiment may be configured in such a manner that the secret key 804 is generated when the tenant ID is issued (when a tenant is newly registered), and the secret key 804 is managed while being associated with the tenant ID at this time.

Further, the client PC 200 accesses the service provider server B 550 to perform preliminary settings for batch printing. The authentication procedure in the service provider server B 550 is similar to the above-described procedure. If the user has been authenticated already, the service provider server B 550 displays a secret key registration screen.

Figure 9:
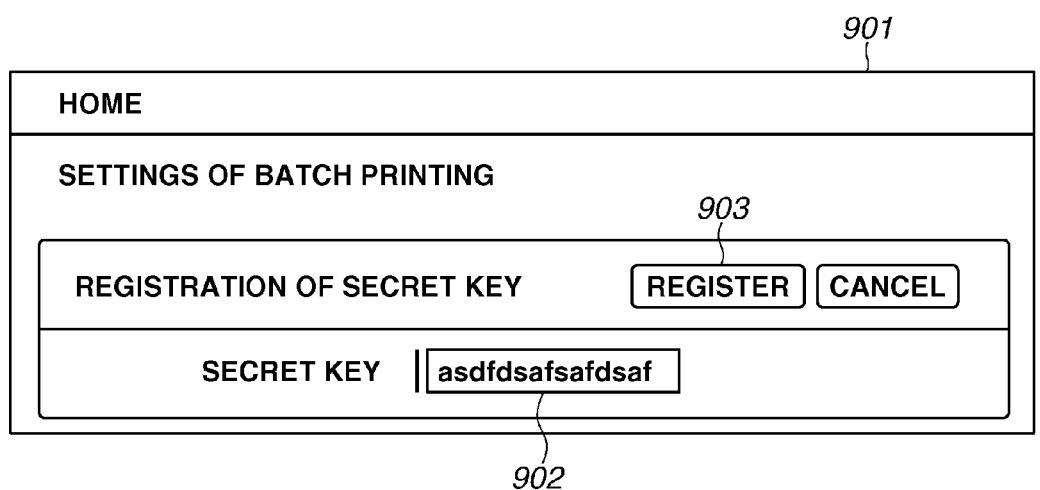
FIG. 9 illustrates an example of a screen of the service provider server B 550 for registering a secret key.

FIG. 9 illustrates an example of a secret key registration screen 901, which the service provider server B 550 provides to the browser 220 according to the present exemplary embodiment. The user (administrator) inputs a secret key displayed on the above-described setting screen 801 for batch printing into a secret key input area 902, and presses a registration button 903. When the registration button 903 is pressed, the service provider server B 550 stores the secret key into the management area prepared for each tenant.

The service provider server B 550 starts the scheduled job when the start time of the scheduled job has come, and requests batch printing to the service provider server A 500.

Upon receiving the request for batch printing, the service provider server A 500 verifies whether this request is appropriate. If this request is appropriate, the service provider server A 500 acquires data from the service provider server B 550 using the server B access token. Then, the service provider server A 500 transmits a document generated based on the acquired data to the service provider server C 560 using the server C access token.

Figure 2:
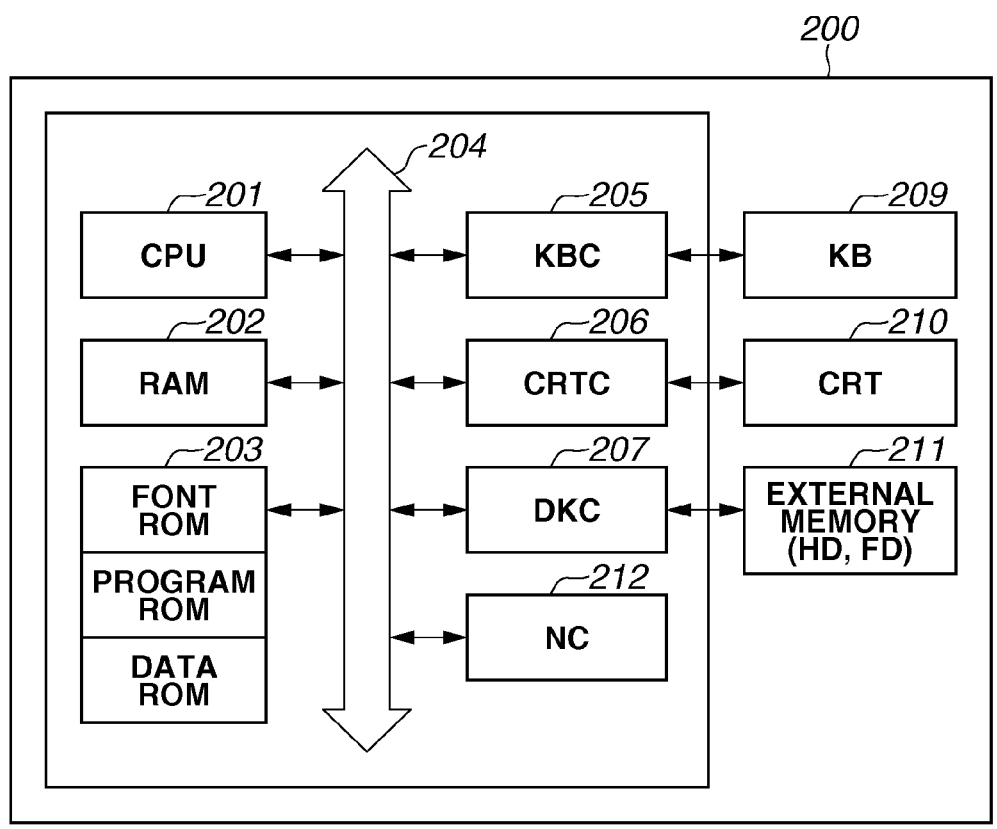
FIG. 2 is a block diagram illustrating a hardware configuration.

FIG. 2 illustrates a configuration of the client PC 200 according to the present exemplary embodiment. Further, server computers that provide the authentication service determination server 300, the authentication server A 400, the authentication server B 450, the service provider server A 500, the service provider server B 550, and the service provider server C 560 are also configured in a similar manner to the client PC 200. In this manner, a hardware configuration of a commonly used information processing apparatus can be used for the client PC 200 and the servers according to the present exemplary embodiment.

Referring to FIG. 2, a central processing unit (CPU) 201 executes a program such as an operating system (OS) and an application stored in a program read only memory (ROM) of a ROM 203, or loaded from a hard disk (HD) 211 to a random access memory (RAM) 202. The HD 211 may be a solid state disk (SSD). The "OS" stands for an operating system that runs on a computer. Hereinafter, the operating system will be referred to as the OS. Processing of respective flowcharts that will be described below can be realized by executing this program. The RAM 202 functions as, for example, a main memory or a work memory for the CPU 201. A keyboard controller (KBC) 205 controls a key input from a keyboard (KB) 209 and a pointing device (not illustrated). A cathode-ray tube (CRT) controller (CRTC) 206 controls a display of a CRT display 210. A disk controller (DKC) 207 controls data access to the HD 211, a floppy (registered trademark) disk (FD), and the like that store various kinds of data. A network card (NC) 212 is connected to the network, and controls communication with another apparatus connected to the network.

In all of the following descriptions, the hardware that actually executes the processing is the CPU 201, and the software that actually executes the processing is the application program installed in the HD 211, unless otherwise indicated.

Further, the CPU 201 performs the processing based on the program stored in the HD 211, thereby realizing software configurations illustrated in FIGS. 3 to 5, and processes in respective steps in flows that will be described below.

Figure 5:
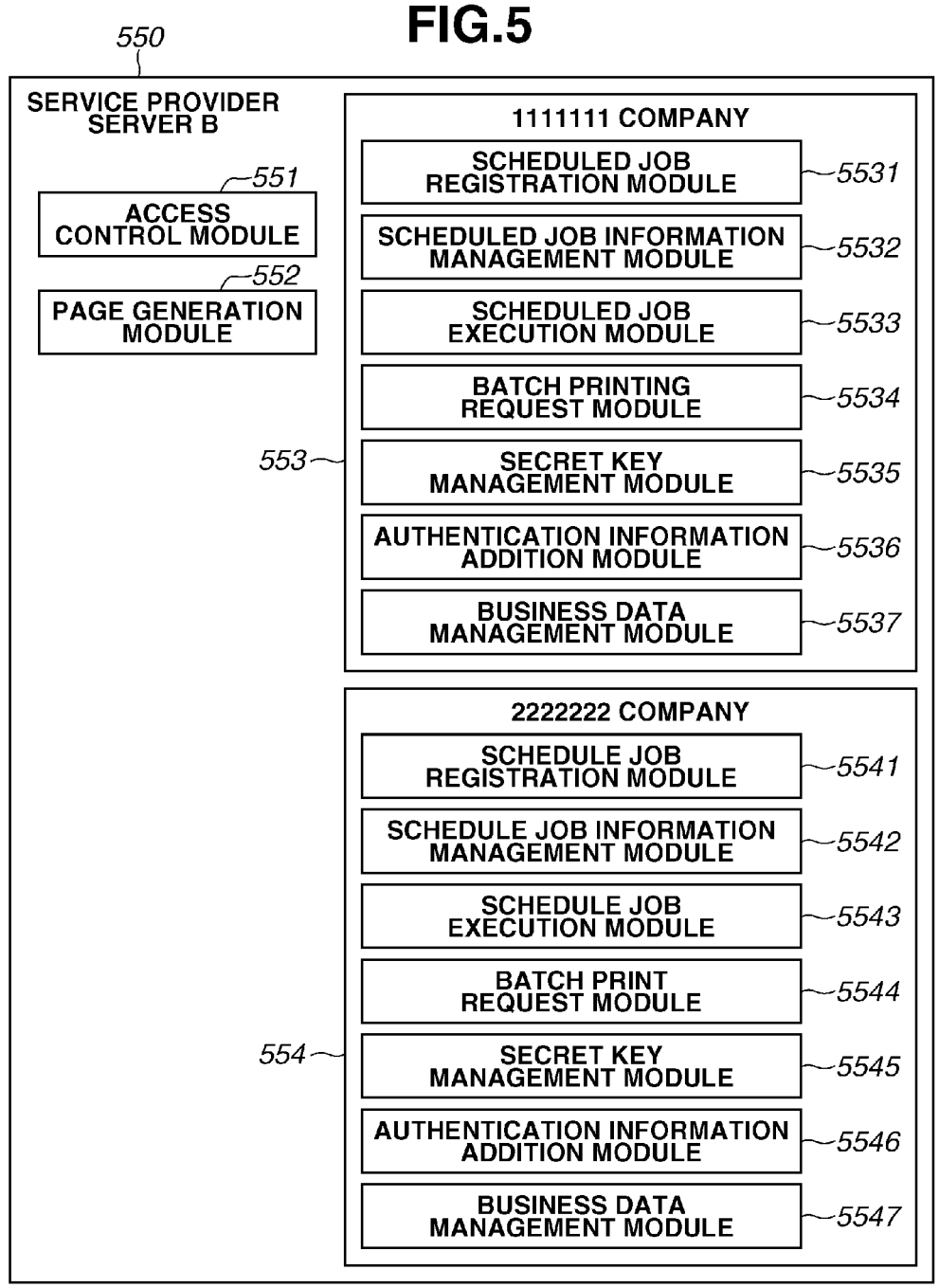
FIG. 5 is a block diagram illustrating a module configuration of a service provider server B 550.

FIG. 5 illustrates a module configuration of the service provider server B 550 according to the present exemplary embodiment. The service provider server B 550 includes an access control module 551, a page generation module 552, scheduled job registration modules 5531 and 5541, scheduled job information management modules 5532 and 5542, scheduled job execution modules 5533 and 5543, batch printing request modules 5534 and 5544, secret key management modules 5535 and 5545, authentication information addition modules 5536 and 5546, and business data management modules 5537 and 5547.

After the service provider server B 550 receives an access, the access control module 551 determines whether the user's access has been authenticated already. If the user's access is not authenticated yet, the page generation module 552 provides the authentication screen to the browser 220. If the user's access has been authenticated already, the service provider server B 550 provides the service.

The scheduled job registration modules 5531 and 5541 register a scheduled job. Information regarding a scheduled job such as a job start time is managed by the scheduled job information management modules 5532 and 5542.

When a start time of a scheduled job has come, the scheduled job execution module 5533 or 5543 carries out the scheduled job. The batch printing request module 5534 or 5544 is invoked by the scheduled job execution module 5533 or 5543, and issues a request for requesting batch printing to the service provider server A 500. The secret key management module 5535 or 5545 stores and acquires the secret key so that the service provider server A 500 checks the validity of the batch printing request. Then, the authentication information addition module 5536 or 5546 generates information required for the validity check and adds it to the request.

After the service provider server B 550 receives a request for acquiring business data, the business data management module 5537 or 5547 acquires business data, and returns it to an apparatus which has issued the request.

Further, the service provider server B 550 manages the scheduled job registration modules 5531 and 5541, the scheduled job information management modules 5532 and 5542, the scheduled job execution modules 5533 and 5543, the batch printing request modules 5534 and 5544, the secret key management modules 5535 and 5545, the authentication information addition modules 5536 and 5546, and the business data management modules 5537 and 5547 for each tenant. These modules managed for each tenant may be stored in the same HD 211 and may be managed in such a manner that data pieces for the respective tenants are logically separated from one another. Alternatively, the modules may be managed while being physically separated from one another in different HDs 211. Further, these modules are one as an entity. The service provider server B 550 provides a tenant ID to the respective modules, by which the respective modules perform operations dedicated to this tenant. For example, access limitation is imposed on only a data area specific to the tenant. FIG. 5 illustrates the modules grouped for each tenant according to this intention.

Figure 3:
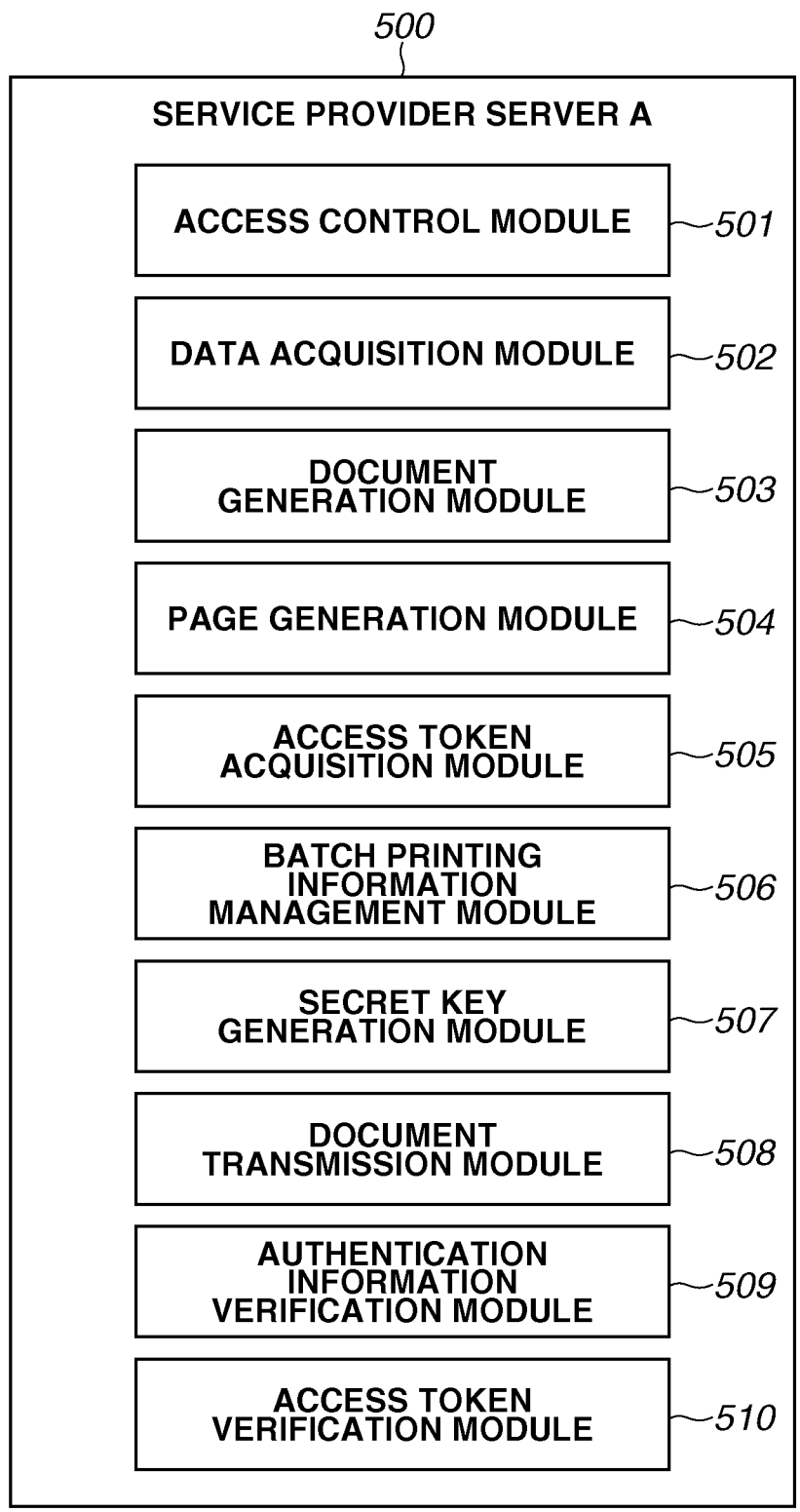
FIG. 3 is a block diagram illustrating a module configuration of a service provider server A 500.

FIG. 3 illustrates a module configuration of the service provider server A 500 according to the present exemplary embodiment. The service provider server A 500 includes an access control module 501, a data acquisition module 502, a document generation module 503, a page generation module 504, an access token acquisition module 505, a batch printing information management module 506, a secret key generation module 507, a document transmission module 508, an authentication information verification module 509, and an access token verification module 510.

After the service provider server A 500 receives access, the access control module 501 determines whether this access has been authenticated already. If the access has been authenticated already, the service provider server A 500 provides the service.

The service provider server A 500 performs batch printing in response to the batch printing request from the service provider server B 550. Upon receiving the batch printing request, the authentication information verification module 509 verifies the received printing request. Information required for the verification is stored in the HD 211 in advance, and is managed by the batch printing information management module 506.

FIG. 10 illustrates an example of batch printing information stored in the HD 211. The secret key, and the access tokens and the refresh tokens of the servers B and C, which will be described below, are stored while being associated with the tenant ID of the service provider server A 500. The refresh token is an indefinitely usable token required to reissue the access token when the access token has expired. In the illustrated example, the batch printing information regarding two tenants having tenant IDs "1000AA" and "1000BB" is stored. The secret key stored as the batch printing information is used to verify the batch printing request. A specific verification method will be described below.

The secret key in the batch printing information stored in the HD 211 in advance is generated by the secret key generation module 507, and is managed while being associated with the tenant ID of the service provider server A 500. Further, the server B access token and the service C access token in the batch printing information are acquired by the access token acquisition module 505 from the service provider server B 550 and the service provider server C 560, respectively. Then, they are also managed while being associated with the tenant ID of the service provider server A 500.

The data acquisition module 502 acquires the business data from the service provider server B 550 with use of the server B access token. The document generation module 503 acquires a form managed by a form management module (not illustrated), and generates a document from the business data acquired by the data acquisition module 502 and the form. The document transmission module 508 transmits the document generated by the document generation module 503 to the service provider server C 560 with use of the server C access token. The access token verification module 510 determines whether the server B access token and the server C access token have expired, and reacquires the tokens if they have expired.

Figure 4:
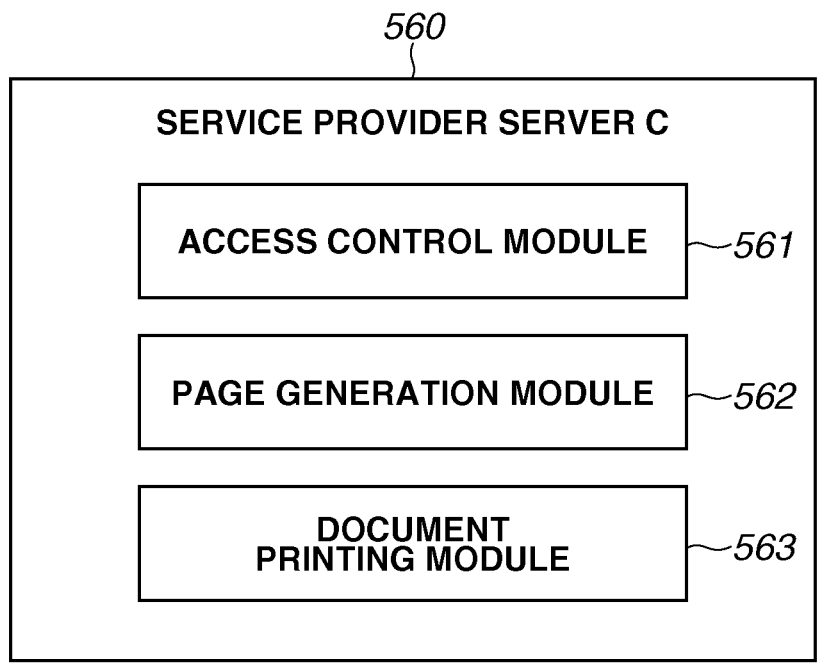
FIG. 4 is a block diagram illustrating a module configuration of a service provider server C 560.

FIG. 4 illustrates a module configuration of the service provider server C 560 according to the present exemplary embodiment. The service provider server C 560 includes an access control module 561, a page generation module 562, and a document printing module 563.

After the service provider server C 560 receives access, the access control module 561 determines whether the user's access has been authenticated already. If the user's access has not been authenticated yet, the page generation module 562 provides an authentication screen to the browser 220. If the user's access has been authenticated already, the service provider server C 560 provides the service.

The document printing module 563 prints the document transmitted from the service provider server A 500. The details thereof will be described in a description of step S1524.

In the following description, preparations for performing batch printing will be described with reference to FIGS. 11 to 14.

Figure 11:
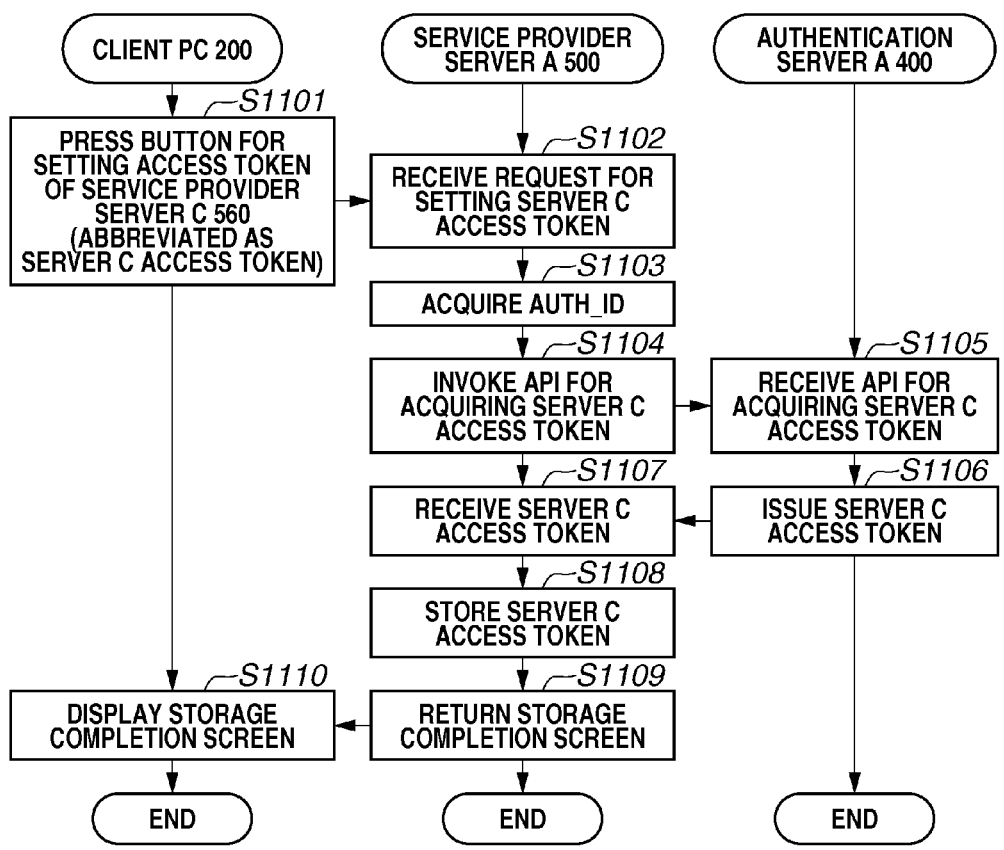
FIG. 11 is a flowchart illustrating a flow performed by a browser, the service provider server A 500, and an authentication server A 400.

FIG. 11 illustrates a flow performed by the browser 220, the service provider server A 500, and the authentication server A 400 according to the present exemplary embodiment. In step S1101, the user presses the button 802 for setting the server C access token on the setting screen 801 for batch printing, which is displayed on the browser 220, and this triggers a start of the present flow.

In step S1102, the service provider server A 500 receives a request for setting the server C access token. The browser 220 has already completed user authentication to the service provider server A 500 by a login operation before the present flow starts, and an authentication session ID of the service provider server C 560 has been already issued by the authentication server A 400. The authentication session ID of the service provider server C 560 is specified in a Uniform Resource Locator (URL) parameter "AUTH_ID" by the browser 220, and is contained in the request for requesting setting of the server C access token in the present step S1102.

In the present exemplary embodiment, the present flow is performed assuming that the authentication session ID is added to Cookie "AUTH_SESSION_ID". However, the authentication session ID may be added by another method than Cookie.

In step S1103, the service provider server A 500 acquires the authentication session ID of the service provider server C 560, which is contained in the parameter "AUTH_ID" as the URL parameter of the above-described request for requesting setting of the server C access token.

In step S1104, the service provider server A 500 invokes an application programming interface (API) for acquiring an access token, which is prepared in the authentication server A 400, while specifying the authentication session ID of the service provider server C 560 acquired in the above-described step S1103 as a parameter.

In step S1105, the authentication server A 400 receives the invocation of the API for acquiring the server C access token from the service provider server A 500. Then, in step S1106, the authentication server A 400 issues the server C access token and the server C refresh token. Then, the authentication server A 400 returns the issued access token and refresh token to the service provider server A 500.

In step S1107, the service provider server A 500 receives the server C access token and the server C refresh token as return values of the API.

In step S1108, the service provider server A 500 stores the server C access token and the server C refresh token received in step S1107 into the HD 211 while associating them with the tenant ID of the service provider server A 500. The tenant ID has been already identified and recognized by the service provider server A 500 at the time of completion of the login before the present flow starts.

In step S1109, the service provider server A 500 returns a storage completion screen, which indicates completion of the storage of the server C access token and the server C refresh token, to the browser 220.

In step S1110, the browser 220 displays the storage completion screen returned in step S1109.

Then, the present flow, which is performed by the browser 220, the service provider server A 500, and the authentication server A 400, ends. The above-described flow is a flow for acquiring the access token using the API for issuing an access token, which is prepared in the authentication server A400, but this flow may be realized by any other method that enables the service provider server A 500 to acquire information required for the service provider server A 500 to access the service provider server C 560.

Figure 12:
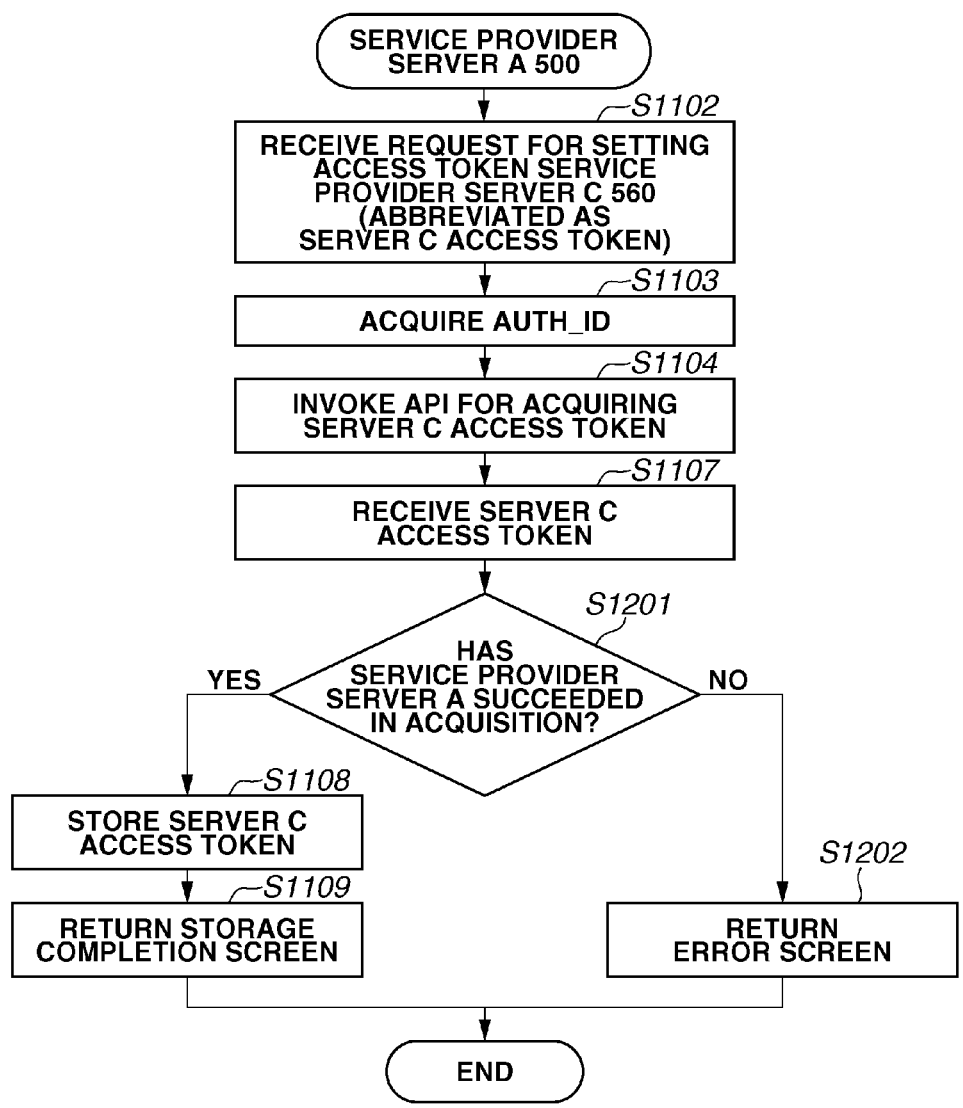
FIG. 12 is a flowchart illustrating a flow performed by the service provider server A 500.

FIG. 12 illustrates a flow performed by the service provider server A 500 according to the present exemplary embodiment. This flow is a flow illustrating error processing when the service provider server A 500 acquires the server C access token. Steps similar to those described already are assigned the same step numbers as those described already, and descriptions thereof will be omitted unless otherwise noted.

In step S1201, the service provider server A 500 determines whether the service provider server A 500 could acquire the server C access token and the server C refresh token appropriately in step S1107. For example, the service provider server A 500 may have failed to acquire the access token when the authentication session ID acquired in step S1103 has expired.

If the service provider server A 500 could acquire the access token appropriately (YES in step S1201), the processing proceeds to step S1108. If the service provider server A 500 has failed in acquiring the access token (NO in step S1201), the processing proceeds to step S1202.

If the service provider server A 500 has failed in acquiring the server C access token and the server C refresh token (NO in step S1201), in step S1202, the service provider server A 500 returns an error screen that indicates the failure in acquiring the server C access token and the server C refresh token to the browser 220.

Then, the present flow, which is performed by the service provider server A 500 regarding acquisition and storage of the server C access token, ends.

Figure 13:
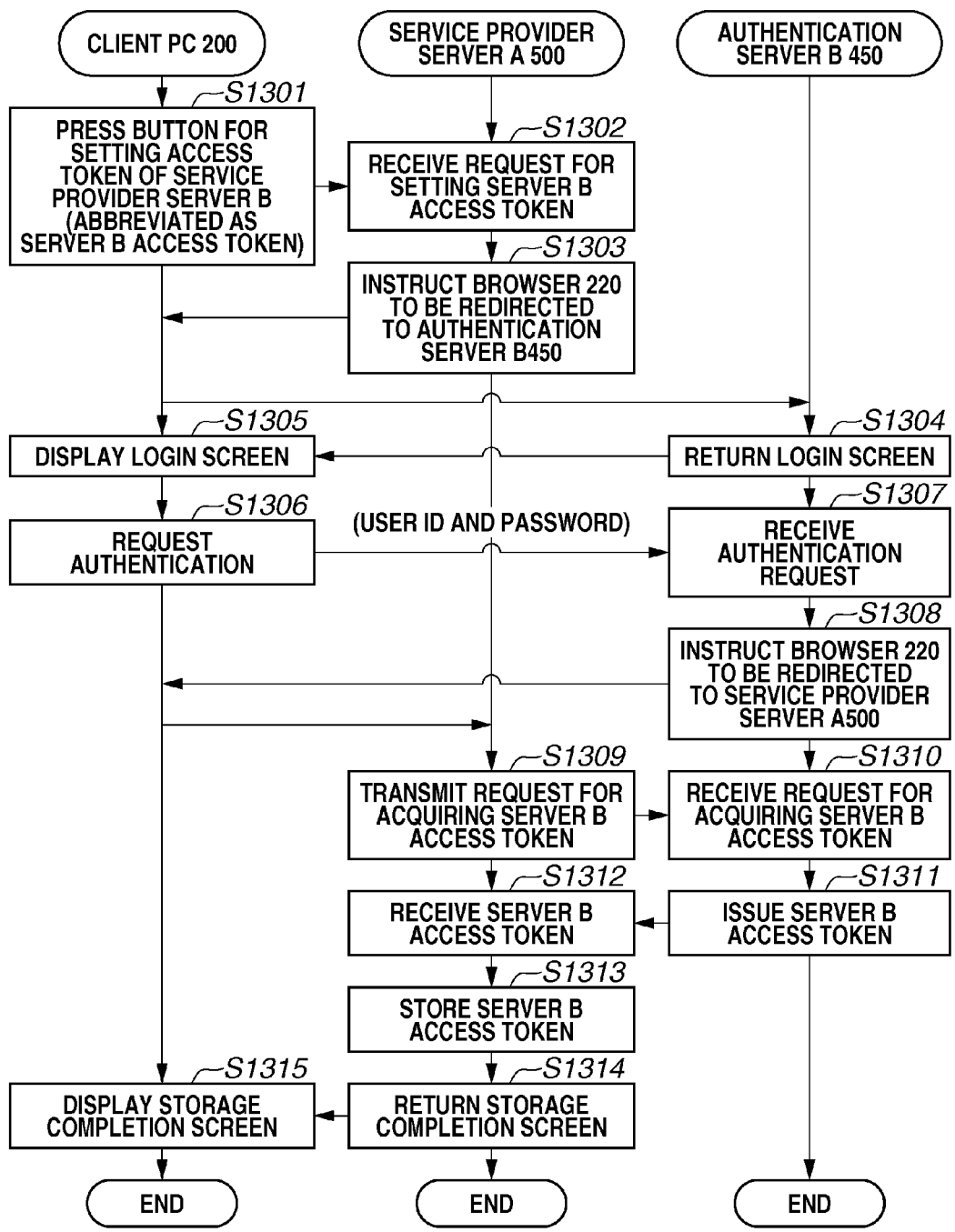
FIG. 13 is a flowchart illustrating a flow performed by the browser, the service provider server A 500, and an authentication server B 450.

FIG. 13 illustrates a flow performed by the browser 220, the service provider server A 500, and the authentication server B 450 according to the present exemplary embodiment. In step S1301, the user presses the button 803 for setting the server B access token on the setting screen 801 for batch printing, which is displayed on the browser 220, and this triggers a start of the present flow.

In step S1302, the service provider server A 500 receives a request for setting the access token of the server provider service B 550.

In step S1303, the service provider server A 500 instructs the browser 220 to be redirected to the authentication server B 450. At that time, the service provider server A 500 adds a client identifier of a source that requests setting of the access token and a redirection URL to a URL as redirection parameters so that the authentication server B 450 can recognize the source that requests setting of the access token (i.e., the service provider server A 500) and a redirection destination after completion of authentication. The client identifier is an identifier indicating that the source that accesses the authentication server B 450 is the service provider server A 500.

In step S1304, the authentication server B 450 returns a display of a login screen (not illustrated) to the browser 220.

In step S1305, the browser 220 displays the login screen returned in step S1304. The user inputs a user ID and a password of the service provider server B 550 on the login screen displayed on the browser 220, and presses a permission button for authentication.

In response to the user's pressing of the authentication button, in step S1306, the browser 220 requests the authentication server B 450 to allow access from the service provider server A 500 to the service provider server B 550.

In step S1307, the authentication server B 450 receives the authentication request from the browser 220. In step S1308, the authentication server B 450 instructs the browser 220 to be redirected to the service provider server A 500. The redirection destination is added to the URL by the service provider server A 500 as the parameter at the time of redirection to the authentication server B 450 in step S1303. An authentication code is contained in a URL parameter of the redirection to the service provider server A 500. The authentication code is a token valid for only a short time period to indicate permission for user's access, which is used to acquire the access token.

Upon receiving the redirected access, in step S1309, the service provider server A 500 transmits a request for acquiring the server B access token to the authentication server B 450. At that time, the service provider server A 500 attaches the authentication code contained in the URL parameter of the redirection as a URL parameter of the request.

In step S1310, the authentication server B 450 receives the request for acquiring the server B access token from the service provider server A 500. In step S1311, the authentication server B 450 issues the server B access token and the server B refresh token. Then, the authentication server B 450 returns these tokens to the service provider server A 500 as a response.

In step S1312, the service provider server A 500 receives the server B access token and the server B refresh token as the response.

In step S1313, the service provider server A 500 stores the server B access token and the server B refresh token received in step S1312 into the HD 211 while associating them with the tenant ID of the service provider server A 500. The tenant ID has been already identified and recognized by the service provider server A 500 at the time of completion of the login before the present flow starts.

In step S1314, the service provider server A 500 returns a storage completion screen, which indicates completion of the storage of the server B access token and the server B refresh token, to the browser 220.

In step S1315, the browser 220 displays the storage completion screen returned in step S1314.

The browser 220, the service provider server A 500, and the authentication server B 450 perform the flow regarding acquisition and storage of the server B access token in the above-described manner. The above-described flow is a flow for acquiring the access token according to OAuth. However, this flow may be realized by any other method that allows the service provider server A 500 to acquire information required for the service provider server A 500 to access the service provider server B 550.

Figure 14:
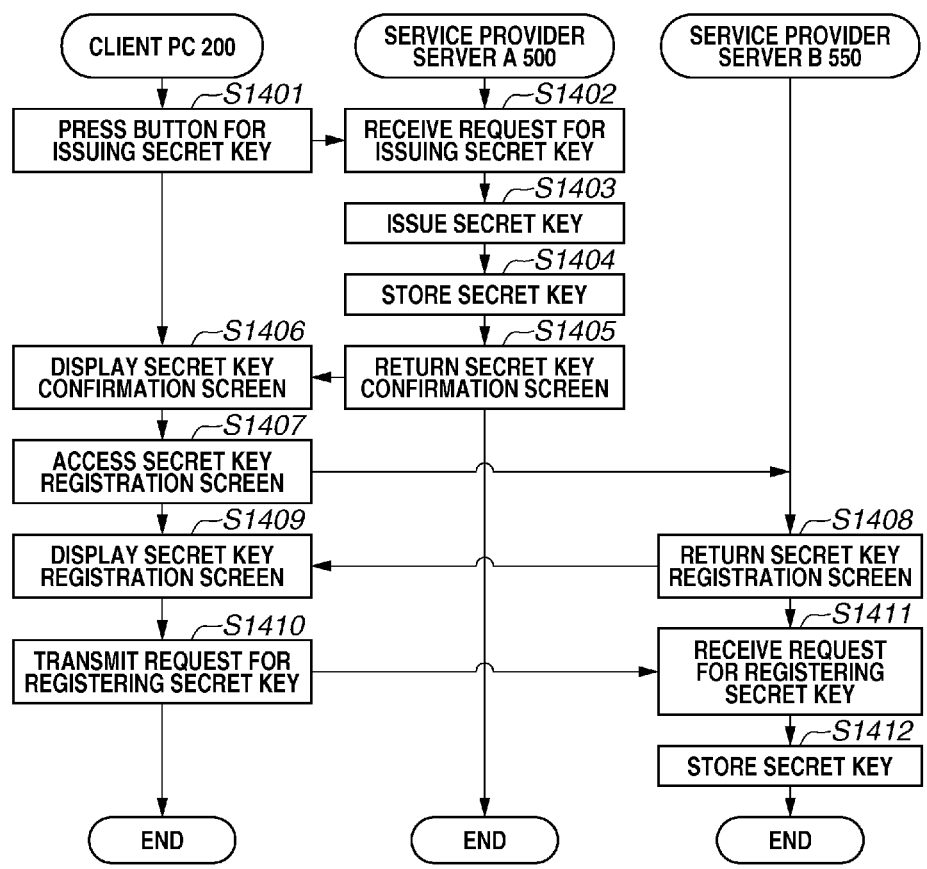
FIG. 14 is a flowchart illustrating a flow performed by the browser, the service provider server A 500, and the service provider server B 550.

FIG. 14 illustrates a flow performed by the browser 220, the service provider server A 500, and the service provider server B 550 according to the present exemplary embodiment. In step S1401, the user presses a button for issuing a secret key on a secret key issuance screen (not illustrated), which is displayed on the browser 220 by being provided by the service provider server A 500, and this triggers a start of the present flow.

In step S1402, the service provider server A 500 receives a request for issuing a secret key.

In step S1403, the service provider server A 500 issues (generates) a secret key. In the present exemplary embodiment, the secret key is a combination of a Universally Unique Identifier (UUID) generated by the service provider server A 500 and the tenant ID of the service provider server A 500, but may have another content.

In step S1404, the service provider server A 500 stores the secret key issued in step S1403 into the HD 211 while associating it with the tenant ID of the service provider server A 500. The tenant ID has been already identified and recognized by the service provider server A 500 at the time of completion of the login before the present flow starts. Further, once the secret key is stored in step S1404, the secret key is not generated again in step S1403.

In step S1405, the service provider server A 500 returns the secret key confirmation screen 801, which allows the user to confirm the secret key issued in step S1403, to the browser 220.

In step S1406, the browser 220 displays the secret key confirmation screen 801 that has been returned in step S1405. The user writes down or copies the displayed secret key to specify the secret key on the secret key registration screen 901, which will be described below.

In step S1407, the browser 220 accesses the secret key registration screen 901 provided by the service provider server B 550. The user is authenticated at this time if necessary.

In step S1408, the service provider server B 550 returns the secret key registration screen 901, which allows the user to register the secret key, to the browser 220.

In step S1409, the browser 220 displays the secret key registration screen 901 that has been returned in step S1408. Then, the user inputs the written or copied secret key into the displayed secret key registration screen 901.

In step S1410, the browser 220 issues a request for registering the secret key to the service provider server B 550. It is desirable that the communication between the client PC 200 and the service provider server B 550 is encrypted, because the secret key is contained as a parameter of a URL of the request. The present exemplary embodiment has been described based on an example of the GET method, according to which the secret key is transmitted with use of the parameter of the URL. However, obviously, the secret key may be transmitted by the POST method.

In step S1411, the service provider server B 550 receives the request for registering the secret key from the browser 220.

In step S1412, the service provider server B 550 stores the secret key contained in the request received in step S1411 into the HD 211 while associating it with the tenant ID of the service provider server A 500. The tenant ID has been already stored in the service provider server B 550 in advance with use of a storage screen (not illustrated). The tenant ID of the service provider server A 500 and the tenant ID of the service provider server B 550 are associated with each other in a one-to-one relationship. Further, it is desirable that the secret key and the tenant ID of the service provider server A 500 are stored in a different area for each tenant of the service provider server B 550 and managed so as to prevent access from a tenant other than the tenant to be processed. Further, a same secret key is used for even different scheduled jobs, as long as these jobs correspond to a same tenant ID of the service provider server B 550.

Then, the present flow, which is performed by the browser 220, the service provider server A 500, and the service provider server B 550, ends.

Next, batch printing, which is performed after completion of the preparations described with reference to FIGS. 11 to 14, will be described.

Figure 15B:
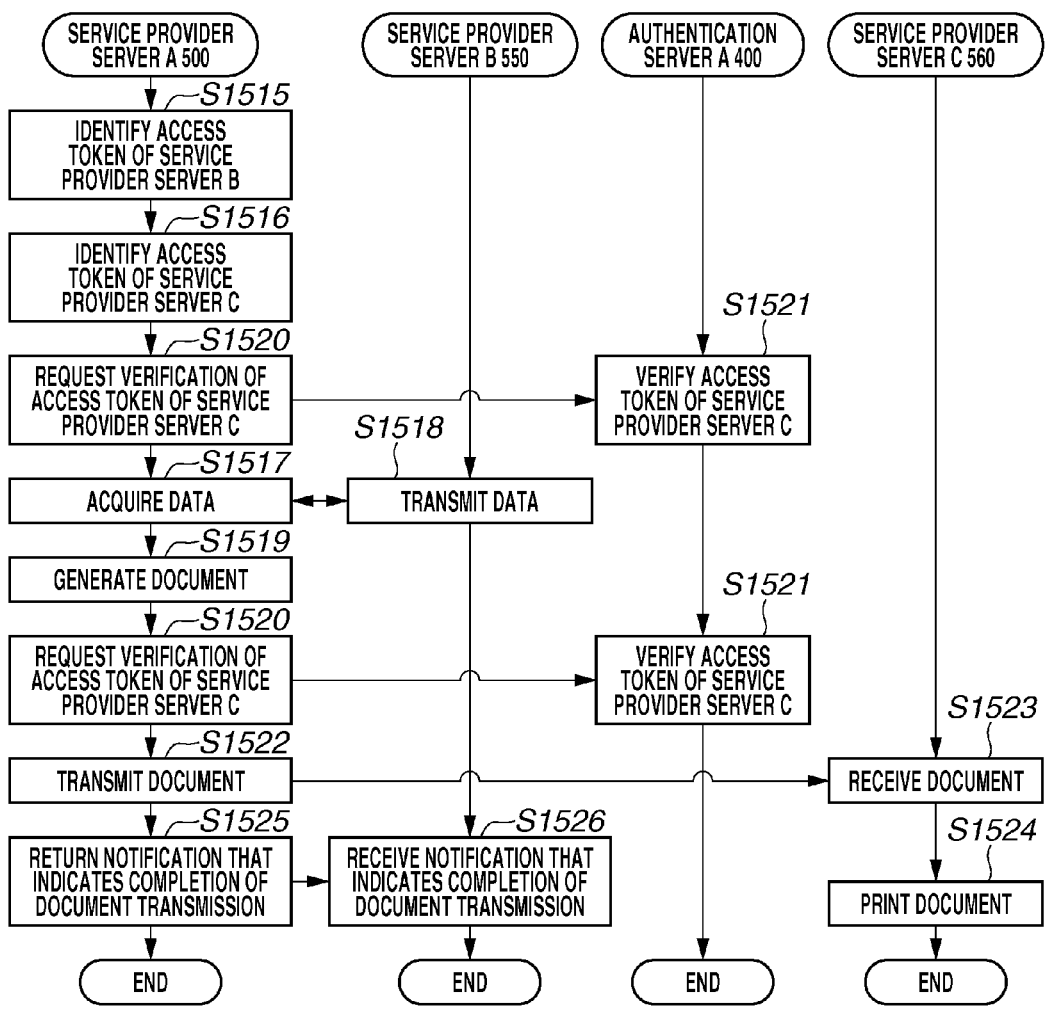

FIGS. 15A and 15B illustrate flows performed by the service provider server A 500, the service provider server C 560, the service provider server B 550, and the authentication server A 400 according to the present exemplary embodiment. A scheduled job is started by the scheduled job execution module 5533 or 5543 according to an execution start time of the scheduled job managed by the scheduled job information management module 5532 or 5542 of the service provider server B 550, and this triggers a start of the present flows.

In step S1501, the scheduled job execution module 5533 or 5543 of the service provider server B 550 starts to carry out the scheduled job. The scheduled job execution module 5533 or 5543 checks execution start times of all of the scheduled jobs managed by the scheduled job information management module 5532 or 5542, and starts to carry out a scheduled job, the execution start time of which has come. Upon starting to carry out the scheduled job, the scheduled job execution module 5533 or 5543 invokes the batch printing request module 5534 or 5544, and passes over the subsequent processing thereto.

In step S1502, the batch printing request module 5534 or 5544 of the service provider server B 550 requests the service provider server A 500 to carry out batch printing. Because the batch printing request is issued as a scheduled job that does not require user's login, the system of the service provider server B 550 itself carries out this job actually (under the system authority) instead of a certain specific user, unlike a normal printing request issued after use's login. Therefore, the service provider server A 500, which receives the request, cannot determine the validity of the batch printing request based on a user and a tenant ID.

In step S1503, the access control module 501 of the service provider server A 500 receives the batch printing request. As described above, since information for identifying a user such as an authentication session ID is not contained in the batch printing request, therefore, the service provider server A 500 verifies whether the service provider server A 500 can accept the batch printing request by steps S1504 to S1512, which will be described below.

In step S1504, the authentication information verification module 509 of the service provider server A 500 transmits a challenge of Digest authentication to the service provider server B 550.

FIG. 17 illustrates an example of the challenge of Digest authentication (a part of a WWW-Authenticate response header) transmitted by the authentication information verification module 509 according to the present exemplary embodiment. The name of the service of the service provider server A 500 is set in a realm 1702. A Digest authentication algorithm "SHA-256" is set in an algorithm 1703. A one-time token generated by the authentication information verification module 509 is set in a nonce 1704. The one-time token means a token used only for Digest authentication, which is used at the time of Digest authentication.

In step S1505, the access control module 551 of the service provider server B 550 receives the challenge of Digest authentication, and provides it to the authentication information addition module 5536 or 5546.

In step S1506, the secret key management module 5535 or 5545 of the service provider server B 550 acquires the secret key stored into the HD 211 in step S1412. The secret key management module 5535 or 5545 identifies the tenant ID corresponding to the current scheduled job, and acquires the secret key associated with this tenant ID. The secret key management module 5535 or 5545 provides the acquired secret key to the authentication information addition module 5536 or 5546.

In step S1507, the authentication information addition module 5536 or 5546 of the service provider server B 550 acquires the tenant ID corresponding to the scheduled job.

In step S1508, the authentication information addition module 5536 or 5546 of the service provider server B 550 generates a response of Digest authentication from the challenge of Digest authentication provided from the access control module 551 in step S1505, the secret key provided from the secret key management module 5535 or 5545 in step S1506, the tenant ID of the service provider server A 500 acquired in step S1507, and the like.

FIG. 18 illustrates an example of the challenge of Digest authentication (a part of an Authorization request header) generated by the authentication information addition module 5536 or 5546 according to the present exemplary embodiment. The tenant ID of the service provider server A 500 corresponding to the secret key acquired in step S1506 is set in a username 1802. The values in the same items contained in the above-described challenge of Digest authentication are set in a realm 1803 and a nonce 1804, respectively. A one-time token generated by the authentication information addition module 5536 or 5546 is set in a cnonce 1806. Then, a string is formed by connecting the username 1802, the realm 1803, the nonce 1804, the cnonce 1806, and the secret key provided from the secret key management module 5535 or 5545 in step S1506, and a digest is further formed from this string with use of "SHA-256" specified in an algorithm 1805. The resultant value is set in a response 1807.

In step S1509, the authentication information addition module 5536 or 5546 of the service provider server B 550 transmits the response of Digest authentication generated in step S1508 to the service provider server A 500. At that time, the authentication information addition module 5536 or 5546 sets the tenant ID of the service provider server A 500 acquired in step S1507 to a URL parameter "tenant_ID", separately from the response of Digest authentication.

In step S1510, the access control module 551 of the service provider server A 500 receives the response of Digest authentication and the URL parameter transmitted from the service provider server B 550. In this step S1510, the access control module 551 acquires the value of the URL parameter "tenant_ID" to determine which tenant is accessing.

In step S1511, the batch printing information management module 506 of the service provider server A 500 searches the batch printing information stored in the HD 211 using the value of the URL parameter "tenant_ID" received in step S1510 as a key. Then, the batch printing information management module 506 identifies and acquires the secret key associated with this tenant ID. After that, the batch printing information management module 506 provides the acquired secret key and the tenant ID to the authentication information verification module 509.

In step S1512, the authentication information verification module 509 of the service provider server A 500 verifies the validity of the response of Digest authentication received in step S1510. The authentication information verification module 509 connects the username 1802, the realm 1803, the nonce 1804, and the cnonce 1806 in the response of Digest authentication (the Authorization request header) received in step S1510, and the secret key provided in step S1511 by the same method as the method when the authentication information addition module 5536 or 5546 generated the response, and forms a digest from the connected string with use of "SHA-256" specified in the algorithm 1805. The authentication information verification module 509 verifies the validity by comparing the value formed as the digest to the value in the response 1807 in the response of Digest authentication and determining whether they match each other. If they match each other, the authentication information verification module 509 determines that the response of Digest authentication is valid. If the authentication information verification module 509 determines that the response of Digest authentication is valid, the processing proceeds to step S1515 illustrated in FIG. 15B. If the authentication information verification module 509 determines that the response of Digest authentication is invalid, the page generation module 504 of the service provider server A 500 generates an error screen, and returns it to the service provider server B 550. In this case, the scheduled job of batch printing is suspended here.

In the processing illustrated in FIG. 15A, the secret key is used as the identifier for performing Digest authentication, as described above. Therefore, the processing illustrated in FIG. 15A has been described as an example in which the secret key itself is not used for encryption and decryption. However, the present exemplary embodiment is not limited thereto, and may be configured so as to encrypt and decrypt the response of Digest authentication itself by the secret key.

Through the above-described steps, the reception of batch printing at the service provider server A 500 is completed.

A flow when the service provider server A 500 carries out the received batch printing, which will be performed after the processing in FIG. 15A, will be described with reference to FIG. 15B.

In step S1515, the batch printing information management module 506 of the service provider server A 500 searches the batch printing information stored in the HD 211 using the value in the URL parameter "tenant_ID" received in step S1510 as a key. Then, the batch printing information management module 506 identifies and acquires the server B access token associated with this tenant ID.

In step S1516, the batch printing information management module 506 of the service provider server A 500 searches the batch printing information stored in the HD 211 using the value in the URL parameter "tenant_ID" received in step S1510 as a key. Then, the batch printing information management module 506 identifies and acquires the server C access token associated with this tenant ID.

In step S1520, the access token verification module 510 of the service provider server A 500 invokes an API for verifying validity of an access token, which is prepared in the authentication server A 400, while specifying the server C access token acquired in step S1516, and verifies whether this access token is valid. Document generation in step S1519, which will be described below, takes a long time if the acquired data has a large volume, for example. Therefore, in this step S1520, the access token verification module 510 verifies the validity of the server C access token in advance.

In step S1521, in response to the invocation of the API for verifying validity of an access token, the authentication server A 400 verifies whether the specified access token is valid, and returns the verification result to the service provider server A 500. If the acquired verification result indicates that the server C access token is valid, the processing proceeds to step S1517. If the server C access token is not valid (i.e., invalid), the processing proceeds to step S1607 in FIG. 16B. A flow when the access token is not valid will be described separately with reference to FIG. 16B.

In step S1517, the data acquisition module 502 of the service provider server A 500 transmits a request (query) for acquiring business data to the service provider server B 550. The data acquisition module 502 can acquire the business data by specifying the server B access token acquired in step S1515 to a parameter of a Web service API published by the service provider server B 550.

In step S1518, the service provider server B 550 transmits the business data to the service provider server A 500 in response to the API request for acquiring the business data.

In step S1519, the document generation module 503 of the service provider server A 500 acquires a form managed by the form management module (not illustrated), and generates a document from the acquired business data and the acquired form. At that time, the document generation module 503 uses the form set on the scheduled job registration screen 601 illustrated in FIG. 6.

Steps 1520 and 1521 are performed again after the process of step S1519. Thus, the service provider server A 500 reacquires a result of verification of the server C access token. This is because, if the processes from step S1517 to step S1519 take a long time, the server C access token may be invalidated by the time immediately after step S1519 even if the server C access token had been valid until immediately before step S1517.

In FIG. 15B, steps 1520 and 1521 are performed twice, but the present exemplary embodiment may be configured to perform them only once.

In step S1522, the document transmission module 508 of the service provider server A 500 transmits the document generated in step S1519 to the service provider server C 560. The document transmission module 508 can transmit the document by specifying the server C access token acquired in step S1516 to a parameter of a Web server API published by the service provider server C 560.

In step S1523, the access control module 561 of the service provider server C 560 receives the document. In step S1524, the document printing module 563 prints this document. The term "print" here is used to refer to converting the document into a Page Description Language (PDL) format, transmitting the PDL data to a printer, and causing the printer to print a document based on the PDL data.

In step S1525, the document transmission module 508 of the service provider server A 500 returns a notification that indicates completion of the document transmission to the browser 220. In the present flow, the service provider server A 500 returns the notification that indicates completion of the document transmission to the browser 220 without waiting for completion of the printing of the document at the service provider server C 560 (step S1524). However, the service provider server A 500 may wait for completion of the printing of the document, and return a notification that indicates the completion of the printing to the browser 220.

In step S1526, the browser 220 receives the notification that indicates completion of the document transmission returned in step S1525.

Then, the present flow, which is performed by the service provider server A 500, the service provider server C 560, the service provider server B 550, and the authentication server A 400, ends.

Figure 16A:
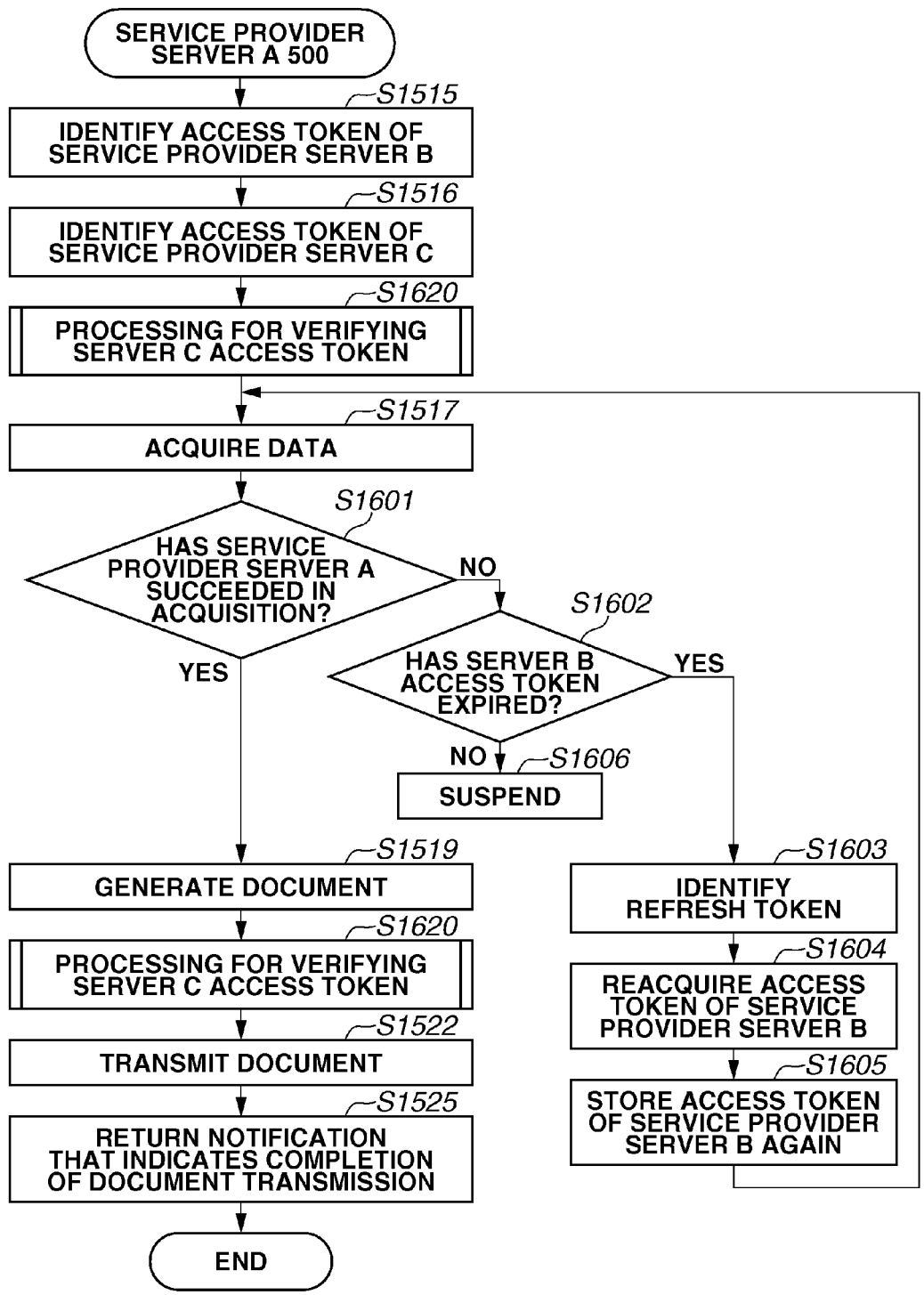
FIGS. 16A and 16B are flowcharts illustrating flows performed by the service provider server A 500.
Figure 16B:
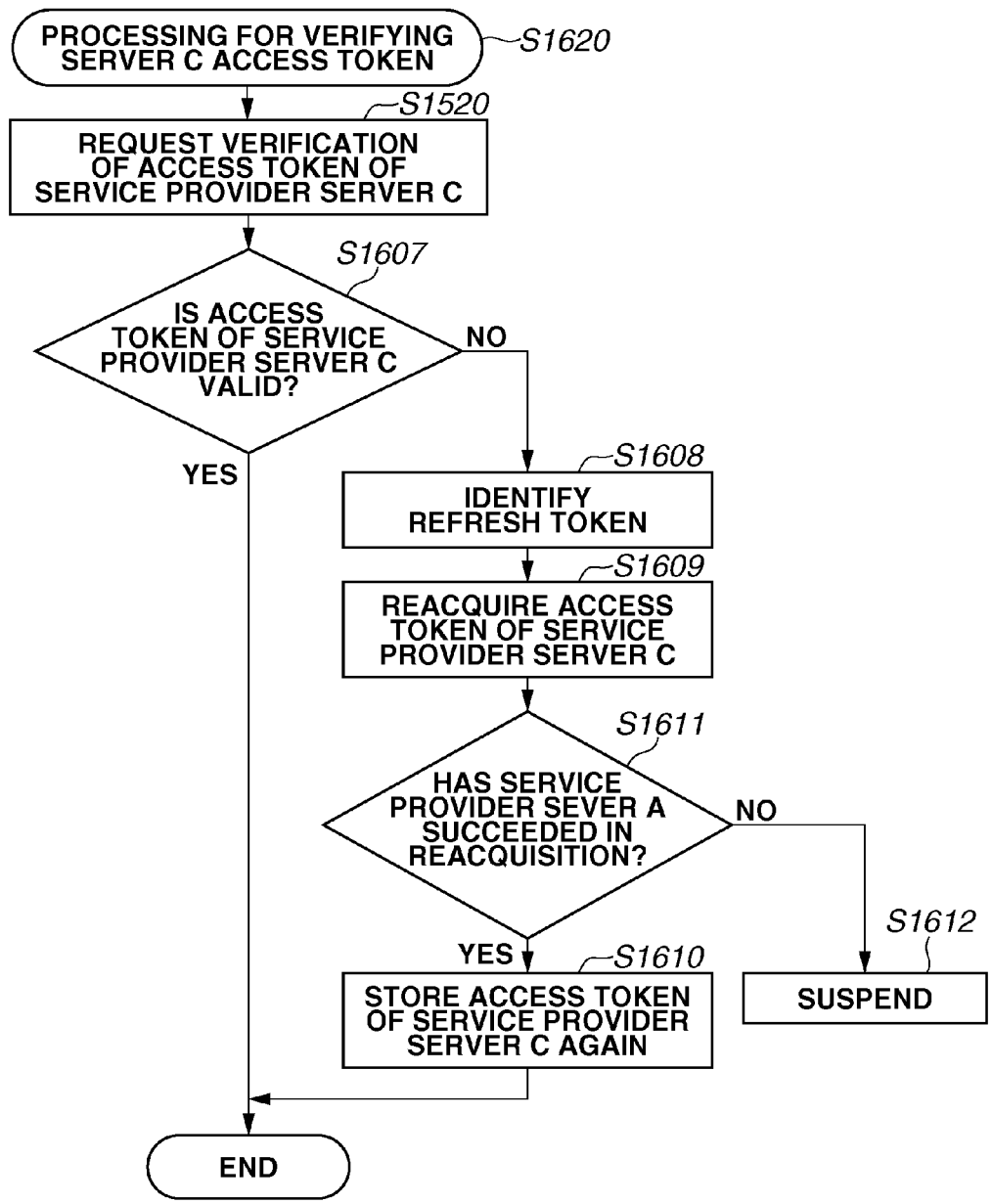

FIGS. 16A and 16B illustrate flows performed by the service provider server A 500 according to the present exemplary embodiment. The present flows are flows indicating processing when the server B access token required to acquire the business data and the server C access token required to transmit the document have expired in addition to the processing illustrated in FIG. 15B. Steps similar to the steps described already are assigned the same step numbers as the steps described already, and descriptions thereof will be omitted unless otherwise noted.

Step S1620 indicates a process for verifying the validity of the server C access token. In the following description, the process performed in step S1620 will be described.

In step S1607, the access token verification module 510 of the service provider server A 500 determines whether the server C access token is valid based on the result of the verification of the validity of the server C access token returned from the authentication server A 400 in step S1520.

If the server C access token is valid (YES in step S1607), the processing proceeds to step S1517. If the server C access token is not valid (NO in step S1607), the processing proceeds to step S1608. As described with reference to FIG. 15B, the service provider server A 500 performs the process of step S1620 for verifying the validity of the server C access token twice. Therefore, if the access token verification module 510 determines that the server C access token is valid in step S1607 in step S1620 performed after step S1519, the processing proceeds to step S1522.

In step S1608, the batch printing information management module 506 of the service provider server A 500 identifies and acquires the server C refresh token stored in step S1108 illustrated in FIG. 11. The batch printing information management module 506 searches the batch printing information in the HD 211 using the value of the URL parameter "tenant_ID" received in step S1510 as a key to identify the server C refresh token associated with this tenant ID.

In step S1609, the access token acquisition module 505 of the service provider server A 500 invokes an API for reacquiring the server C access token, which is prepared in the authentication server A 400. At that time, the access token acquisition module 505 of the service provider server A 500 specifies the server C refresh token acquired in step S1608 as a parameter when invoking the API. In response to the invocation of the API, the authentication server A 400 verifies the refresh token. If the refresh token is valid, the authentication server A 400 reissues the server C access token, and returns this token to the service provider server A 500 as a return value of the API.

In step S1611, the service provider server A 500 determines whether the service provider server A 500 has succeeded in reacquisition of the server C access token in step S1609. As a result of the determination, if the service provider server A 500 has succeeded in reacquisition of the server C access token (YES in step S1611), the processing proceeds to step S1610. If the service provider server A 500 has not succeeded in reacquisition of the server C access token (NO in step S1611), the processing proceeds to step S1612. Then, the processing is suspended.

In step S1610, the batch printing information management module 506 of the service provider server A 500 stores the server C access token reacquired from the authentication server A 400 in step S1609 into the HD 211 again while associating it with the tenant ID of the service provider server A 500.

Next, step S1601 in FIG. 16A, which is a subsequent step to step S1517, will be described. In step S1601, the data acquisition module 502 of the service provider server A 500 determines whether the data acquisition module 502 has succeeded in acquisition of the business data in step S1517. If the data acquisition module 502 has succeeded in acquisition of the business data (YES in step S1601), the processing proceeds to step S1519. If the data acquisition module 502 has failed in acquisition of the business data (NO in step S1601), the processing proceeds to step S1602. The data acquisition module 502 may fail in acquisition of the business data when the access token has expired or there is some problem with the query for acquiring the data.

In step S1602, the data acquisition module 502 of the service provider server A 500 analyzes an error that is issued from the service provider server B 550 in the case of a failure in acquisition of the business data, and determines whether this error is an error due to expiration of the server B access token. If the error is an error due to expiration of the server B access token (YES in step S1602), the processing proceeds to step S1603. If not (NO in step S1602), the data acquisition module 502 determines that the data acquisition module 502 cannot acquire the business data for some reason (for example, a non-existent table is specified in the query). Then, in step S1606, the flow is suspended.

In step S1603, the batch printing information management module 506 of the service provider server A 500 identifies and acquires the server B refresh token stored in step S1313 illustrated in FIG. 13. The batch printing information management module 506 searches the batch printing information in the HD 211 using the value of the URL parameter "tenant_ID" received in step S1510 as a key to identify the server B refresh token associated with this tenant ID.

In step S1604, the access token acquisition module 505 of the service provider server A 500 transmits a request for reacquiring the server B access token to the authentication server B 450. At that time, the access token acquisition module 505 of the service provider server A 500 attaches the refresh token acquired in step S1603 as a URL parameter of the request. Upon receiving the request, the authentication server B 450 verifies the refresh token. If the refresh token is valid, the authentication server B 450 reissues the server B access token, adds this token to a response, and returns the response to the service provider server A 500.

In step S1605, the batch printing information management module 506 of the service provider server A 500 stores the server B access token reacquired from the authentication server B 450 in step S1604 into the HD 211 again while associating it with the tenant ID of the service provider server A 500.

Next, a second exemplary embodiment of the present invention will be described with reference to the drawing. Descriptions of similar portions to the first exemplary embodiment will be omitted. In the following description, only differences from the first exemplary embodiment will be described.

FIG. 19 illustrates a flow performed by the service provider server A 500 according to the second exemplary embodiment. Steps similar to the steps described already are assigned the same step numbers as the steps described already, and descriptions thereof will be omitted unless otherwise noted. In step S1901, the service provider server A 500 determines whether the received request is a batch printing request issued from the service provider server B 550, or a printing request issued from the browser 220 by a user's operation. The service provider server A 500 makes this determination based on whether a session ID of an authenticated user of the service provider server B 550 is contained in a parameter "sessionid" as a URL parameter of the request. If no session ID is contained (YES in step S1901), the service provider server A 500 determines that the received request is a batch printing request, and the processing proceeds to step S1503. If a session ID is contained (NO in step S1901), the service provider server A 500 determines that the received request is a printing request issued by a user's operation, and the processing proceeds to step S1902. In step S1902, the service provider server A 500 accesses the service provider server B 550 with use of the above-described session ID to acquire business data. Then, in step S1903, the service provider server A 500 generates a document. In step S1904, the service provider server A 500 transmits the document generated in the previous step S1903 to the service provider server C 560, and issues a request for requesting printing. User authentication is required for the document transmission to the service provider server C 560, and an authentication session ID of the service provider server C 560 is contained in a parameter "AUTH_ID" as a URL parameter of the request for requesting printing. In transmitting the document, the service provider server A 500 uses this authentication session ID.

According to the second exemplary embodiment, even when there are both a batch printing request issued from the service provider server B 550 and a normal printing request issued from the browser 220 by a user's operation, it is possible to respond to both of the requests without changing the configuration of the service provider server A 500.

Further, the present invention can be also realized by performing the following processing.

This processing is by supplying software (a program) capable of realizing the functions of the above-described exemplary embodiments to a system or an apparatus via a network or various kinds of storage media, and causing a computer (or, for example, a CPU or a micro processing unit (MPU)) of the system or the apparatus to read out this program to execute it.

According to the present invention, it is possible to identify the first token and the second token based on the identifier, and to take advantage of the tokens by using the identified first token for the first external information processing apparatus and using the identified second token for the authentication processing apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-027837 filed Feb. 15, 2013, which is hereby incorporated by reference herein in its entirety.

What is claimed is:

1. A server system comprising:
a reception unit configured to receive an identifier from a first external information processing apparatus;
an identification unit configured to identify, based on the identifier, a first access token for acquiring data from the first external information processing apparatus and a second access token for acquiring a verification result from an authentication processing apparatus;
a generation unit configured to acquire data from the first external information processing apparatus using the first access token to generate a document from the acquired data;
an acquisition unit configured to acquire the verification result of the second access token from the authentication processing apparatus by transmitting the second access token to the authentication processing apparatus; and
a transmission unit configured to transmit the generated document to a second external information processing apparatus using the second access token;
wherein at least one of the reception unit, the identification unit, the generation unit, the acquisition unit and the transmission unit is implemented, at least in part, by at least one hardware processor.

2. The server system according to claim 1, wherein the acquisition unit acquires the verification result of the second access token before the generation unit generates the document, and reacquires the verification result of the second token after the generation unit generates the document.

3. The server system according to claim 1, wherein the generation unit ends processing without generating the document from the acquired data if the authentication processing apparatus determines that the second access token is invalid.

4. The server system according to claim 1, wherein the second external information processing apparatus converts the document and transmits the converted document to a printer.

5. The server system according to claim 1, further comprising an authentication unit configured to authenticate the first external information processing apparatus if a request for batch printing is received from the first external information processing apparatus,
wherein the reception unit receives the identifier as a response to the authentication.

6. The server system according to claim 1, wherein the generation unit acquires the data from the first external information processing apparatus with use of the first access token and generates the document from the acquired data if the verification result acquired by the acquisition unit indicates that the second access token is valid.

7. A control method comprising:
receiving an identifier from a first external information processing apparatus;
identifying, based on the identifier, a first access token for acquiring data from the first external information processing apparatus and a second access token for acquiring a verification result from an authentication processing apparatus;
acquiring data from the first external information processing apparatus using the first access token to generate a document from the acquired data;
acquiring the verification result of the second access token from the authentication processing apparatus by transmitting the second access token to the authentication processing apparatus; and
transmitting the generated document to a second external information processing apparatus using the second access token.

8. The control method according to claim 7, further comprising acquiring the verification result of the second access token before the document is generated, and reacquiring the verification result of the second access token after the document is generated.

9. The control method according to claim 7, further comprising ending processing without generating the document from the acquired data if the authentication processing apparatus determines that the second access token is invalid.

10. The control method according to claim 7, wherein the second external information processing apparatus converts the document and transmits the converted document to a printer.

11. The control method according to claim 7, further comprising authenticating the first external information processing apparatus if a request for batch printing is received from the first external information processing apparatus, and
receiving the identifier as a response to the authenticating.

12. The control method according to claim 7, further comprising acquiring the data from the first external information processing apparatus with use of the first access token and generating the document from the acquired data if the acquired verification result indicates that the second access token is valid.

* * * * *